INVENTORS:
ERWIN WEINBRENNER, PETER HOPPE, KARL BREER.
BY
ATTORNEY

United States Patent Office 3,009,209
Patented Nov. 21, 1961

3,009,209
METHOD OF PRODUCING LARGE BODIES OF UNIFORM CELLULAR POLYURETHANE PLASTICS
Erwin Weinbrenner, Leverkusen, Peter Hoppe, Troisdorf, and Karl Breer, Koln-Flittard, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
Filed Aug. 1, 1957, Ser. No. 675,606
Claims priority, application Germany Aug. 3, 1956
1 Claim. (Cl. 18—58)

This invention relates to a process for producing polyurethane plastics. More particularly, the invention is concerned with a process for the production of large objects of polyurethane plastics.

It is well known to produce polyurethane plastics by reacting a high molecular weight polyhydroxy compound with a polyisocyanate and a cross-linking agent in the presence or absence of activators. One mode of carrying out this reaction comprises injecting the polyisocyanate and/or cross-linking agent into a continuous stream of the polyhydroxy compound and discharging the resulting mixture while in the liquid state from the injection zone into a zone where conversion of the liquid mixture into a solid polyurethane plastic takes place (see U.S. Patent 2,764,565). This mixing technique is particularly suitable for use in the production of polyurethane foam and makes it possible to obtain a material of uniform structure. However, when producing large objects of polyurethane plastics by introducing a liquid reactive mixture of the components into a mold or space of large dimensions, the solid polyurethane plastic formed in said large mold or space is apt to contain cracks, voids, cells of different size and other defects.

It is, therefore, a primary object of the present invention to provide a process for the production of large objects of polyurethane plastics having a uniform mechanical structure. Another object of the invention is to provide a process for the production of large objects of polyurethane plastics which are free from undesirable cracks and voids. Another object of the invention is to provide a process for the production of large objects of polyurethane foam having a uniform cell structure. A further object of the invention is to provide a process for the production of polyurethane rubber and other homogeneous polyurethane plastics which are devoid of structural defects. A further object is to provide a method for the production of large bodies of polyurethane plastics. Still further objects will become apparent from the following description with reference to the accompanying diagrammatic drawings which illustrate two types of apparatus for carrying the process of the invention into effect.

Figure 1:
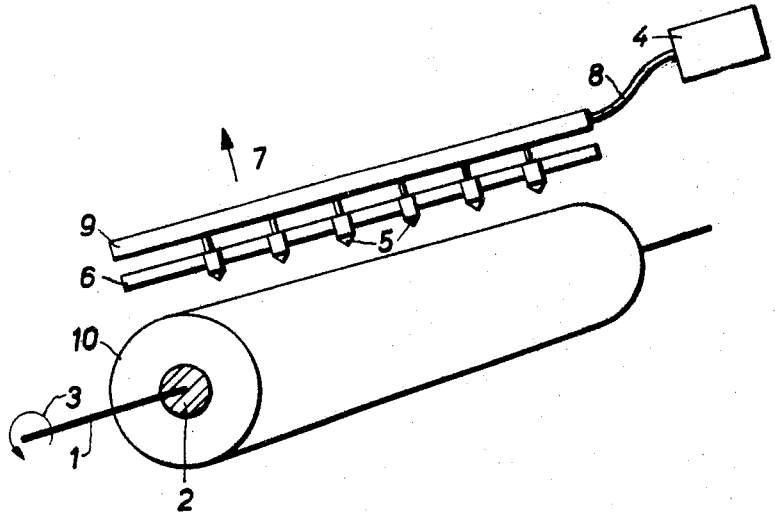
Figure 2:
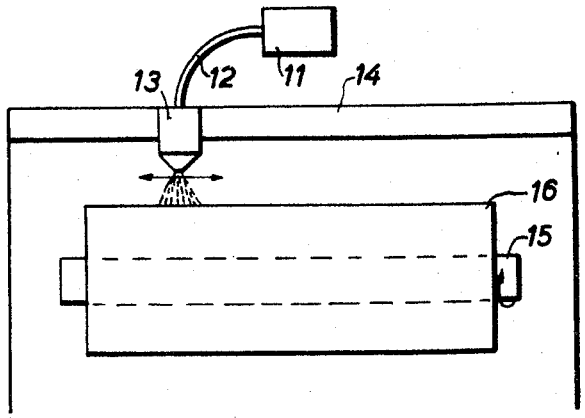

In the drawings:
FIGURE 1 is a perspective view of an apparatus for the production of large bodies of polyurethane plastics in accordance with the invention.
FIGURE 2 is a longitudinal sectional view of another apparatus for the production of large bodies of polyurethane plastics in accordance with the invention.

In accordance with this invention, generally speaking, the foregoing objects and others are accomplished by spraying a liquid reactive mixture capable of forming a solid polyurethane plastic onto a surface in such fashion as to form on said surface a plurality of superimposed layers of said liquid reactive mixture, said layers solidifying one after the other with formation of a uniform body of solid polyurethane material.

In a specific embodiment, the process of the invention comprises spraying a liquid reactive mixture capable of forming a solid polyurethane plastic onto a rotating core in thin layers which follow one upon the other. Another embodiment of the process of the invention comprises spraying a liquid reactive mixture capable of forming a solid polyurethane plastic onto a stationary core from an opening which moves back and forth above the surface of said core.

It has been found in accordance with this invention that uniform polyurethane bodies with large dimensions can be produced if the liquid reactive mixture of the components is sprayed onto a rotating cylinder in thin layers which follow one upon the other, the spraying rate being so controlled that the separately applied layers are satisfactorily united and produce a uniform body. In general, it is necessary for the spraying velocity not to fall below a certain level and, in addition, a predetermined peripheral velocity of the rotating cylinder must not be exceeded in order to obtain good adhesion of the applied layer of material to the rotating core and good bonding of the applied material to the layer previously sprayed on the cylinder. The process of the invention makes it possible to produce bodies of polyurethane plastic which have a length of 10 meters and a diameter of 3 meters.

In carrying out the process of the invention, the peripheral speed of the rotating cylinder must be made dependent on the spraying rate. If the polyurethane plastic to be produced is polyurethane foam, it may be advisable to carry out a supplementary heat treatment before foaming of the sprayed mixture takes place. This heat treatment can be effected either by supplying hot air (50° to 70° C.) or by the use of infra-red radiation. The spraying of the reactive mixture with compressed air at normal temperature leads to an increase in the weight per unit of volume or to a lower reaction velocity than the selected formulation would usually provide when foaming large quantities of reactants to produce polyurethane foam in block form.

The thickness of the blown layers should as far as possible not exceed 2 millimeters in order to insure a good penetration of the heat and to prevent a lifting of the layers.

When producing very long cylindrical elements, for instance cylinders of a length of 10 meters or so, it is advisable to use a plurality of spraying nozzles in juxtaposition, the blowable mixture being continuously supplied from said nozzles onto a rotating cylinder. However, it is also possible to operate with one spraying nozzle and to move the nozzle back and forth parallel to the axis of the rotating cylinder.

In many cases, particularly good results are obtained if the distance of the nozzle or nozzles is kept constant from the surface of application. This can be achieved by using a device wherein the axis of the rotating cylinder is moved away from one or more stationary nozzles, or one or more movable nozzles are moved away from a stationary axis at such a rate that the distance between the nozzle or nozzles and the surface of application is always the same, for example, 30 centimeters.

Referring more particularly to the drawing, numeral 2 in FIGURE 1 represents a cylindrical core rotating around the axis 1 at the gradually decreasing rate 3. The liquid reactive mixture capable of forming a solid polyurethane plastic is discharged from the nozzles 5 mounted on support 6 and fed from pipe 9 which is connected to the mixing device 4 by the flexible conduit 8. During the spraying operation, the pipe 9 moves in the direction of arrow 7 so as to keep the distance between the nozzles 5 and the surface of application constant. The liquid reactive mixture thus applied solidifies during the spraying operation to form the polyurethane body 10. It is also possible to move the rotating core 2 away from the nozzles 5 if the latter are arranged in a fixed position.

In the apparatus illustrated in FIGURE 2, the nozzle 13 is connected to the mixing device 11 by the flexible conduit 12. The nozzle 13 is moved back and forth on the cross bar 14 by means of a chain drive (not shown) above the slowly rotating core 15. The liquid reactive mixture discharged from nozzle 13 forms the solid polyurethane body 16.

Although the axis of the apparatus shown in the drawing is in a horizontal position, the process of the invention can also be carried out with a cylinder rotating around a vertical axis. It is likewise possible to spray the liquid reactive mixture onto a stationary cylindrical core from a plurality of nozzles mounted on a ring surrounding said cylindrical core if the nozzles on said ring are moved back and forth in the direction of the axis of the cylindrical core.

Although the process of the invention can be used in the production of polyurethane rubber and other homogeneous polyurethane plastics, it has proven particularly useful in the production of porous polyurethane plastics, which are commonly referred to as polyurethane foam. During the last ten years, a considerable volume of literature relating to the production of polyurethane foam has been published and any of the starting materials and formulations disclosed in the literature can be used to produce polyurethane foam by the process of the invention. However, in order to provide sufficient detail with respect to specific starting materials and formulations that are especially useful to make polyurethane foam and at the same time achieve a certain degree of brevity herein, reference is made to U.S. Patent 2,764,565 and German Patent 929,507.

The invention is further illustrated by the following examples without being restricted thereto.

*Example 1*

For the production of a cylindrical element of a width of 1 meter consisting of elastic polyurethane foam of a bulk density of 45 kg./cm.³, the following formulation can be used:

100.0 parts by volume of polyester prepared from—
    15 mols of adipic acid
    16 mols of diethylene glycol
    1 mol of trimethylol propane
44.0 parts by volume of toluylene diisocyanate
3.0 parts by volume of bis-(diethyl aminoethanol)-adipate
1.0 part by volume of diethylamine oleate
3.0 parts by volume of sodium salt of a sulfonated castor oil containing 54% water
1.5 parts by volume of sulfonated ricinoleic acid containing 54% water
1.0 part by volume of water
0.5 part by volume of paraffin oil.

These constituents are mixed in a mixing chamber and the liquid foamable mixture is applied to a slowly rotating cylinder by means of three spraying nozzles connected to the mixing chamber.

In order to obtain a good bonding of the individual layers and internal tensile strength of the expanding foams, the mixing process is carried out with additional heating at a temperature of, for example 60° C., to accelerate the reaction.

The delivery rate of the complete spraying apparatus is set at three times 200 g./min. in the present case.

The spacing of the spraying nozzles from the plane of application is about 300 mm. and the nozzle apertures of the spraying chamber have a cross-section of about 2½ mm. The spacing is kept constant by varying the height of the axis or spindle of the rotating core.

*Example 2*

In order to make a cylindrical element having a width of 0.5 m. and a diameter of 1 m. of polyurethane foam, 100.0 parts by weight of an isocyanate-modified polythioether prepared from—
    1 mol of thiodiglycol and
    1 mol of butanehydroxyethyl glycol with concurrent use of 1% of N-methyl diethanolamine and 8% of toluylene diisocyanate are mixed with—

31.0 parts by weight of toluylene diisocyanate and combined, in a movable mixing head equipped with a spraying chamber, with
2.0 parts by volume of accelerator consisting of—
    1 mol of diethyl aminoethanol and
    0.3 mol of benzoic acid with concurrent use of oleic acid
    0.5 part by volume of sodium salt of a sulfonated castor oil containing 54% water, and
    1.5 parts by volume of water.

The nozzle is moved backwards and forwards over the cylinder width of 0.5 meter with a speed of 0.75 m./sec. The spraying apparatus supplies 750 g./min. The time required to produce a cylinder of a width of 0.5 m. and a diameter of 1.0 m. is 25 minutes. The speed of rotation of the core is set at 10 cm./sec. at the circumference of the applied layer. The reaction mixture can be completely processed at normal temperature. Raising of the temperature by infra-red radiation or circulation of hot air through the rotating unit up to a temperature of 50° C. is recommended if it is desired to increase the speed of production, especially in the case of large cylindrical elements.

The distance of the nozzle from the plane of application must always be kept constant (about 30 cm.), i.e., the device must be so constructed that the spindle of the rotating core is moved away from the nozzle or the nozzle is moved away from the rotating cylinder.

Although certain representative embodiments and details have been shown for the purpose of illustrating this invention, it will be apparent to those skilled in the art that various changes and modifications may be made therein without departing from the spirit and scope of the invention except as set forth in the claim.

What is claimed is:

A method for preparing a single layer of solidified cellular polyurethane having a substantially uniform structure and composition throughout which comprises spraying a plurality of layers of a liquid mixture of components which will react to form said plastic over a rotating support, each of said plurality of layers being sprayed over said support while effecting relative movement between the spray and the support in a direction substantially perpendicular to the spray whereby each liquid layer is of substantially uniform thickness throughout, simultaneously effecting relative movement between the spray and the support in a direction substantially parallel to the direction of travel of the spray whereby the distance from the source of spray to the surface on which the spray impinges remains substantially the same throughout the formation of all of the layers, and at the same time controlling the rate of the spray and the rate of rotation of the support in order to spray each subsequent layer onto the immediately preceding layer before the components of the said preceding layer have completely reacted to form a solidified cellular polyurethane plastic, whereby all of the applied layers merge into one and upon chemical reaction form a unitary, substantially uniform cellular polyurethane plastic.

References Cited in the file of this patent

UNITED STATES PATENTS

| | | |
|---|---|---|
| 1,182,982 | Crump | May 16, 1916 |
| 1,969,101 | Semon | Aug. 7, 1934 |
| 2,598,246 | Fowler | May 27, 1952 |
| 2,779,689 | Reis | Jan. 29, 1957 |
| 2,893,063 | Hoppe | July 7, 1959 |

FOREIGN PATENTS

| | | |
|---|---|---|
| 157,812 | Great Britain | Apr. 10, 1922 |
| 277,376 | Great Britain | Dec. 6, 1928 |